United States Patent
Brandwine et al.

(10) Patent No.: US 10,142,290 B1
(45) Date of Patent: Nov. 27, 2018

(54) HOST-BASED FIREWALL FOR DISTRIBUTED COMPUTER SYSTEMS

(71) Applicant: Amazon Technologies, Inc., Seattle, WA (US)

(72) Inventors: Eric Jason Brandwine, Haymarket, VA (US); Robert Eric Fitzgerald, Herndon, VA (US); Alexander Robin Gordon Lucas, Cheltenham (GB)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 15/085,608

(22) Filed: Mar. 30, 2016

(51) Int. Cl.
| | | |
|---|---|---|
| *H04L 9/00* | | (2006.01) |
| *H04L 29/06* | | (2006.01) |
| *G06F 9/455* | | (2018.01) |

(52) U.S. Cl.
CPC ...... *H04L 63/0263* (2013.01); *G06F 9/45558* (2013.01); *H04L 63/20* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,016,351 | B1 | 3/2006 | Farinacci et al. |
| 7,209,473 | B1 | 4/2007 | Mohaban et al. |
| 7,257,689 | B1 | 8/2007 | Baird |
| 7,616,579 | B2 | 11/2009 | Slattery et al. |
| 7,840,670 | B2 | 11/2010 | Hedayat et al. |
| 8,238,834 | B1 | 8/2012 | Bharghavan et al. |
| 8,307,422 | B2* | 11/2012 | Varadhan ............ H04L 12/4633 713/151 |
| 8,443,354 | B1* | 5/2013 | Satish ................. G06F 9/44536 717/104 |
| 8,549,641 | B2 | 10/2013 | Jakobsson |
| 8,788,833 | B2* | 7/2014 | Fukui .................... H04L 9/3226 713/182 |
| 8,931,107 | B1 | 1/2015 | Brandwine |
| 9,032,531 | B1 | 5/2015 | Scorvo et al. |
| 9,189,627 | B1 | 11/2015 | Islam |
| 9,462,013 | B1 | 10/2016 | Boss et al. |

(Continued)

OTHER PUBLICATIONS

Check Point, "Firewall Administration Guide", Version R77, 12/15 found at http://dl3.checkpoint.com/paid/79/7916511f80908c3056af526bae304602/CP_R77_Firewall_AdminGuide.pdf?HashKey=1511120649_66bcd3456845e431d368a251b8d73769&xtn=.pdf.*

(Continued)

*Primary Examiner* — Piotr Poltorak
(74) *Attorney, Agent, or Firm* — Davis Wright Tremaine LLP

(57) ABSTRACT

Customers of a computing resource service provider may utilize computing resources of the computing resources service provided to implement one or more computer systems. Furthermore, the customer may cause a host-based firewall to be executed by the one or more computer systems. The host-based firewall may collect network traffic information. The customer may then be provided with the network traffic information and be prompted to provide decisions associated with the network traffic information. The decisions may be used to generate a set of rules which may be enforced by the host-based firewall.

20 Claims, 8 Drawing Sheets

(56) References Cited

U.S. PATENT DOCUMENTS

| | | |
|---|---|---|
| 9,501,345 B1 | 11/2016 | Lietz et al. |
| 9,521,053 B1 | 12/2016 | Chen et al. |
| 9,565,204 B2* | 2/2017 | Chesla .................. H04L 63/02 |
| 9,609,399 B2 | 3/2017 | Krishnamurthy et al. |
| 9,621,516 B2* | 4/2017 | Basak ................ H04L 63/0263 |
| 9,654,543 B2* | 5/2017 | Yamashima ............ H04L 67/02 |
| 2001/0013105 A1 | 8/2001 | Kang et al. |
| 2003/0084321 A1 | 5/2003 | Tarquini et al. |
| 2003/0188189 A1 | 10/2003 | Desai et al. |
| 2003/0204619 A1* | 10/2003 | Bays .................. H04L 41/0253 709/238 |
| 2004/0003290 A1* | 1/2004 | Malcolm ............ H04L 63/0263 726/14 |
| 2004/0049693 A1 | 3/2004 | Douglas |
| 2004/0064713 A1 | 4/2004 | Yadav |
| 2004/0243707 A1* | 12/2004 | Watkinson .......... H04L 63/0263 709/225 |
| 2004/0250169 A1 | 12/2004 | Takemori et al. |
| 2004/0268150 A1* | 12/2004 | Aaron ................ H04L 63/0209 726/11 |
| 2005/0265331 A1* | 12/2005 | Stolfo .................. G06F 21/552 370/389 |
| 2005/0289649 A1 | 12/2005 | Mitomo et al. |
| 2006/0010289 A1 | 1/2006 | Takeuchi et al. |
| 2006/0053490 A1 | 3/2006 | Herz et al. |
| 2007/0180490 A1* | 8/2007 | Renzi .................. G06F 21/577 726/1 |
| 2007/0263553 A1 | 11/2007 | Bharali et al. |
| 2007/0288247 A1 | 12/2007 | Mackay |
| 2008/0148381 A1* | 6/2008 | Aaron .................. H04L 63/029 726/11 |
| 2008/0163207 A1* | 7/2008 | Reumann .............. G06F 9/5077 718/1 |
| 2008/0189793 A1* | 8/2008 | Kirkup .................. G06F 21/53 726/27 |
| 2009/0007100 A1 | 1/2009 | Field et al. |
| 2009/0070283 A1 | 3/2009 | Kang et al. |
| 2009/0125573 A1 | 5/2009 | Hardy |
| 2009/0249472 A1* | 10/2009 | Litvin ................ H04L 63/0263 726/14 |
| 2010/0031093 A1 | 2/2010 | Sun et al. |
| 2010/0075751 A1 | 3/2010 | Garvey et al. |
| 2010/0161960 A1 | 6/2010 | Sadasivan |
| 2011/0060725 A1 | 3/2011 | Lunde |
| 2011/0072486 A1* | 3/2011 | Hadar .................. G06F 21/6218 726/1 |
| 2011/0138441 A1* | 6/2011 | Neystadt .............. G06F 9/5077 726/1 |
| 2011/0231361 A1* | 9/2011 | Patchava .................. G06F 21/50 707/602 |
| 2012/0260342 A1 | 10/2012 | Dube et al. |
| 2013/0024567 A1 | 1/2013 | Roxburgh et al. |
| 2013/0128751 A1 | 5/2013 | Keesara et al. |
| 2013/0179574 A1* | 7/2013 | Calder .................. G06F 9/5033 709/226 |
| 2013/0212709 A1 | 8/2013 | Tucker |
| 2014/0029449 A1 | 1/2014 | Xu et al. |
| 2014/0173111 A1* | 6/2014 | Varner ................ H04L 63/0281 709/225 |
| 2014/0237599 A1 | 8/2014 | Gertner et al. |
| 2014/0245423 A1* | 8/2014 | Lee ...................... H04L 63/0218 726/12 |
| 2014/0283085 A1* | 9/2014 | Maestas .............. H04L 63/0236 726/25 |
| 2014/0320886 A1* | 10/2014 | Uchikawa ............ H04N 1/4433 358/1.14 |
| 2014/0331304 A1* | 11/2014 | Wong .................... H04L 63/101 726/11 |
| 2014/0351810 A1 | 11/2014 | Pratt et al. |
| 2015/0043578 A1 | 2/2015 | Fidler et al. |
| 2015/0081863 A1 | 3/2015 | Garg et al. |
| 2015/0143478 A1* | 5/2015 | Luckett, Jr. ............ G09G 5/377 726/4 |
| 2015/0207813 A1 | 7/2015 | Reybok et al. |
| 2015/0222656 A1 | 8/2015 | Haugsnes |
| 2015/0237013 A1* | 8/2015 | Bansal ................ H04L 63/0263 726/13 |
| 2015/0264084 A1 | 9/2015 | Kashyap et al. |
| 2015/0288768 A1* | 10/2015 | Goyal .................... G06F 9/455 709/228 |
| 2015/0355957 A1 | 12/2015 | Steiner et al. |
| 2015/0381641 A1 | 12/2015 | Cabrera et al. |
| 2016/0014189 A1* | 1/2016 | Yamashima ............ H04L 67/02 709/217 |
| 2016/0119365 A1 | 4/2016 | Barel |
| 2016/0164919 A1* | 6/2016 | Satish .................. H05K 999/99 726/1 |
| 2016/0191547 A1 | 6/2016 | Zafar et al. |
| 2016/0283259 A1* | 9/2016 | Mehta ................ G06F 9/45558 |
| 2016/0306751 A1 | 10/2016 | Amarendran et al. |
| 2017/0005986 A1* | 1/2017 | Bansal ................ H04L 63/0263 |
| 2017/0063786 A1* | 3/2017 | Pettit .................. H04L 63/0236 |
| 2017/0063927 A1 | 3/2017 | Schultz et al. |
| 2017/0099195 A1 | 4/2017 | Raney |
| 2017/0109310 A1 | 4/2017 | Takahashi et al. |
| 2017/0155673 A1 | 6/2017 | Desai et al. |
| 2017/0171231 A1 | 6/2017 | Reybok, Jr. et al. |
| 2017/0279847 A1 | 9/2017 | Dasgupta et al. |
| 2017/0302673 A1* | 10/2017 | Makhervaks ....... H04L 63/0236 |

OTHER PUBLICATIONS

U.S. Appl. No. 15/085,257, filed Mar. 30, 2016.
U.S. Appl. No. 15/085,554, filed Mar. 30, 2016.
U.S. Appl. No. 15/085,271, filed Mar. 30, 2016.
U.S. Appl. No. 15/085,585, filed Mar. 30, 2016.
U.S. Appl. No. 15/085,708, filed Mar. 30, 2016.
Arpaci-Dusseau et al. "Log-structured File Systems," Operating Systems Version 0.91, www.ostep.org, 2014, 15 pages.
Rosenblum et al., "The Design and Implementation of a Log-Structured File System," University of California at Berkley, ACM Transactions on Computer Systems Volume/Issue 10(1):26-52, Feb. 1992.

* cited by examiner

Security and Troubleshooting Visualization Browser 200

Security Tools 216 — 220

- Virtual Machine Security Setting
- Security Diagnostic Task
- Memory Security Settings
- Network Security Settings

View: Region 1

Knowledge Base 208
- How to troubleshoot
- How to use the console
- Various network issue
- Top 5 common errors
- Using the various rules
- Finding extra help
- How to Rules
- Security support
- Security Tools

Host-Based Firewall Report 204

| Process Name | Host | Server | Port |
|---|---|---|---|
| Browser | Dave | www.example.com | 80 |
| FTP | System | admin.example.com | 44 |
| Mail | System | admin.example.net | 316 |
| Music | Dave | connect.exmpl.com | 22 |
| Video | Tom | stream.exmpl.com | 675 |
| Crypto | Admin | www.exmpl.com | 22 |

Event Viewer 210

| Address | Owner ID |
|---|---|
| xxx.xxx | c1 |
| xxx.xxx | c3 |
| xxx.xxx | c1 |
| xxx.xxx | c6 |
| xxx.xxx | c1 |
| xxx.xxx | c4 |

202

- Console
- Accounts
- Editor
- History

Edit Rules 212
- Rules Analyzer
- Sleep Mode
- Rule Sets
- Suggestions

HOST-BASED FIREWALL FOR DISTRIBUTED COMPUTER SYSTEMS

CROSS-REFERENCE TO RELATED APPLICATIONS

This application incorporates by reference for all purposes the full disclosure of co-pending U.S. patent application Ser. No. 15/085,271, filed concurrently herewith, entitled "CORRELATING THREAT INFORMATION ACROSS MULTIPLE LEVELS OF DISTRIBUTED COMPUTING SYSTEMS", co-pending U.S. patent application Ser. No. 15/085,554, filed concurrently herewith, entitled "CORRELATING THREAT INFORMATION ACROSS SOURCES OF DISTRIBUTED COMPUTING SYSTEMS", co-pending U.S. patent application Ser. No. 15/085,585, filed concurrently herewith, entitled "BLOCK-LEVEL FORENSICS FOR DISTRIBUTED COMPUTING SYSTEMS", co-pending U.S. patent application Ser. No. 15/085,257, filed concurrently herewith, entitled "SOURCE SPECIFIC NETWORK SCANNING IN A DISTRIBUTED ENVIRONMENT", and co-pending U.S. patent application Ser. No. 15/085,708, filed concurrently herewith, entitled "TRANSPARENT VOLUME BASED INTRUSION DETECTION."

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

In a large distributed computing system (e.g., multiple distributed data centers) of a computing resource service provider, various customers, users, services, and resources of the computing resource service provider are in frequent communication with each other. Keeping the system secure becomes more challenging as applications are updated and as the complexity and usage of the system increases. In such distributed computing systems, it can be difficult to identify the vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to collect and analyze log information generated by the computing resources.

BRIEF DESCRIPTION OF THE DRAWINGS

Various techniques will be described with reference to the drawings, in which:

FIG. 2 illustrates an example environment where a remote diagnostic and troubleshooting visualization browser may be used to display network traffic information in accordance with an embodiment;

DETAILED DESCRIPTION

Figure 1:
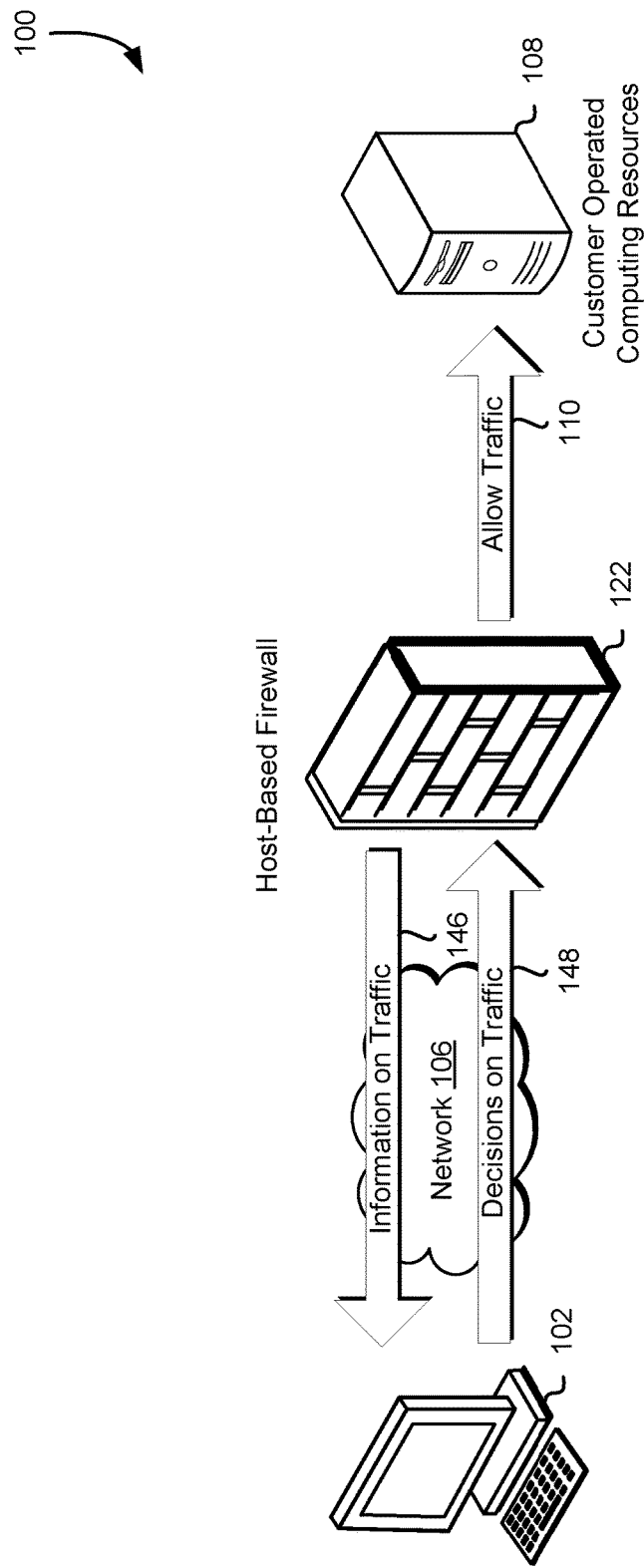
FIG. 1 illustrates an environment in which customers may be provided with network traffic information from a host-based firewall and make decisions associated with network traffic in accordance with at least one embodiment.

In various examples described below, a host-based firewall obtains information corresponding to process, applications, or other software executing on computing resources provided by a computing resource service provider and operated by a customer. The computing resource service provider may provide computing resources such as virtual machines, remote data storage, networking resources, and a variety of other computing resources to customers. Customers may remotely and programmatically manage these computing resources to cause the resources to implement various applications. For example, a customer using a virtual machine can implement a webserver to establish network connections with other customers and entities over a network, such as the Internet. The host-based firewall may be executed within the customer environment, for example, as an application executed by computing resources operated by the customer or an edge sensor within the customer's virtual network.

As a result of the host-based firewall executing within the customer environment, the host-based firewall can obtain process-level information associated with the network connection of computing resources operated by the customer. For example, the host-based firewall may detect a connection attempt and/or the establishment of a connection between a browser application executed by the customer's virtual machine and a server computer at an Internet Protocol (IP) address on the Internet over port 80. The computing resource service provider or service thereof such as a security service may aggregate the information collected by various host-based firewalls and present customers with information corresponding to the operations of computing resources they operate. In addition, the customer can then make a determination as to whether to allow or deny a particular set of traffic. Returning to the example above, the customer is prompted with a decision to allow or deny the connection between the browser application executed by the customer's virtual machine and the server computer on the Internet over port 80.

In another example, the host-based firewall is implemented with a default or initial rule set regarding network traffic to allow and/or deny. The host-based firewall then, over time, collects information about network traffic at the computing resources. After a sufficient amount of time has elapsed or network traffic information collected, the customer may be prompted to provide decisions corresponding to network traffic information collected by the host-based firewall. The decisions made by the customer are then used to generate a set of rules of heuristics for handling network traffic. For example, the customer decides that all network traffic from the browser application to any address on the Internet over port 80 is allowed and a rule may be generated based at least in part on this decision. In another example, the customer may decide that network traffic between any application executed by the computer system over port 443 to a particular address block is always denied and a rule may be generated based at least in part on this decision. The rule may cause a computer system executing the rule, for example customer operated computing resources or an edge sensor, to deny any network connection attempts between the particular address block and customer operated computing resources over port 443.

The host-based firewall may provide customers with an adaptive firewall that may be trained based at least in part on network information obtained from a variety of computing resources operated by one or more customers of a computing resource service provider. In addition, the host-based firewall may automatically, for example, using machine learning or other techniques or with the aid of customer intervention determine information associated with network traffic and make decisions on whether to allow or deny traffic in an effort to mitigate or prevent malicious activity. The customer intervention can include transmitting alerts or other messages to the customer through a management console and receive customer feedback, information, or decisions through the management console. The information obtained from the customer is then used to modify the behavior of host-based firewalls or other security devices. For example, the rule set generated based at least in part on customer decisions is provided to an edge sensor or gateway that allows or denies traffic before it reaches the customer's virtual network.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a host-based firewall 122 may be used to collect information on network traffic 146 and allow or deny traffic in accordance with at least one embodiment. A customer 102 connected to a network 106, such as the Internet or other public network, may receive information associated with network traffic 146 collected by the host-based firewall based at least in part on information obtained from customer operated computing resources 108. For example, a customer of a computing resource service provider may utilize computing resources of the computing resource service provider to implement a virtual machine and load the host-based firewall into memory of the virtual machine to detect and mitigate malicious activity. Attackers may attempt to establish a network connection with the customer operated computing resource 108 over the network 106. The host-based firewall 122 collects information corresponding to network connections and/or network connection attempts as well as allowing or denying network connections based at least in part on a set of rules. The set of rules may be determined based at least in part on decisions on network traffic 148 made by the customer 102.

In the example illustrated in FIG. 1, the host-based firewall 122 is configured to allow network traffic 110 and provide information on network traffic 146. This may be referred to as a "learning period" or "training period," which is a duration or interval during which the host-based firewall 122 collects information on network traffic 146. The information on network traffic 146 is then presented to the customer 102 in such a manner that decisions of network traffic 148 may be obtained and rules may be generated based at least in part on the decision as described in greater detail below. The host-based firewall 122 is used for illustrative purposes only and information on network traffic 146 may be collected from any number of computing resources as described herein. Returning to FIG. 1, the information on network traffic 146 may include process information, application information, source information, destination information, port information, ownership information, or any other information associated with network traffic suitable from presenting to the customer 102 when making a decision on network traffic 148. In addition, the firewall 108 may allow or block traffic based at least in part on a default rule set, decisions on network traffic 148, or a rule set generated based at least in part on decisions on traffic 148.

The operations of the host-based firewall 122 may be recorded in a log or other data structure and considered information on network traffic 146. The log may include a variety of events and other information. For example, the log may indicate an Internet Protocol (IP) address, a port number, protocol, application, owner identifier and other information associated with network traffic received at the host-based firewall 122. The customer 102 is then provided this information. A security service, for example, can periodically or aperiodically generate a set of decisions to be made by the customer 102, the set of decisions based at least in part on the log. The set of decisions are then presented to the customer 102. Over time, the security service may generate a sufficiently large rule set to enable the host-based firewall to make a determination on an amount of network traffic directed at the customer operated computing resources 108 and the frequency at which the customer 102 is prompted to provide decisions on traffic 148 may be reduced.

In various embodiments, the customer 102 has one or more administrators that receive alerts associated with network traffic directed to the customer operated computing resources 108. The one or more administrators may be responsible for making decisions on network traffic 148. The host-based firewall 122 may be set to default allow or default deny for network connection attempts to the customer operated computing resources 108. When a connection attempt or other information on network traffic 146 is received at the host-based firewall 122 a message or other alert is transmitted to an administrator of the one or more administrator prompting for a decisions on network traffic 148. The notification may be an e-mail, Short Message Service (SMS), pop-up, or other suitable message. The administrator then makes a decision whether to allow or deny the network traffic. The decision is then provided to the host-based firewall 122 and the host-based firewall 122 allows or denies the traffic based at least in part on the decision of the administrator.

In addition, the computing resource service provider may provide information on network traffic 146 and decisions on traffic 148 a security service or intrusion detection service. The security service may generate visualizations, alerts, and other information corresponding to the information on network traffic 146 and/or correlate threat information, described in greater detail below, on behalf of the customer. For example, the security service may provide the customer 102 with current network load on the customer's virtual computer system instance including connection attempts and threat scores associated with IP address corresponding to the connection attempts. The intrusion detection service may use the correlated threat information generated based at least in part on the information on network traffic 146 and/or decisions on traffic 148 to perform various attack mitigation and attack detection operations. Furthermore, the intrusion detection system may use the information on network traffic 146 to update firewall settings, intrusion detection settings, and other security settings of various computing systems operated by the computing resource service provider and/or the customer. An intrusion prevention system may also use the information on network traffic 146 and/or decisions on traffic 148 to determine and apply a set of security policies. For example, the intrusion prevention system may limit the types of data that may be transmitted by or obtained from a customer virtual computer system instance or received by computing resources connected to the one or more other networks.

FIG. 2 illustrates an example of a remote diagnostic and troubleshooting visualization browser 202 may be used to display information collected a host-based firewall as described herein at least in connection with FIG. 1 and in accordance with at least one embodiment. The remote diagnostic and troubleshooting visualization browser 202 may be configured to enable a customer to obtain network information, make decisions on network traffic, generate threat information, review threat information, detect vulnerabilities, perform security operations, troubleshoot issues associated with computing resources operated by the customer, receive recommendations associated with the customer's architecture, search a knowledge base for information related to the computing resources operated by the customer, view customer network data, and generally diagnose and troubleshoot issues with the customer computing resources. The remote diagnostic and troubleshooting visualization browser 202 may be configured as a computer service such as a web service and may be provided as a service by the computing resource service provider as described herein at least in connection with FIG. 1.

The remote diagnostic and troubleshooting visualization browser 202 may be provided as a user interface executed by an application, such as a web browser executing on a computer system operated by the customer as well as other user interfaces that may be used to present computing resource and network traffic information to a customer and may, in some embodiments, be generated by the computing resource service provider and sent to the customer's display for rendering. In other embodiments, the customer's computing device may include functionality to generate some or all portions of the user interface. For example, the customer's web browser may include code for generating some of the graphics for rendering data received from the computing resource service provider. The user interface may be generated or caused to be generated by a security service as described in greater detail below.

The remote diagnostic and troubleshooting visualization browser 202 may include security tools 216 that perform various security tasks as described herein and visualization of security information in the remote diagnostic and troubleshooting visualization browser 202. For example, the security tools 216 may include a graphical user interface element, such as the buttons illustrated in FIG. 2, where selection of the graphical user interface element may cause the security service to execute a particular security operation associated with the selected graphical customer element. Once such security tool, as described above, may be configured to generate, by security service or component thereof such as a host-based firewall, network traffic information and notify the customer, via a display pane or display window of the remote diagnostic and troubleshooting visualization browser 202, of network traffic information (e.g., network connections between computing resources operated by the customer and one or more other computer system). The customer may utilize these tools to generate information about the customers' virtual network and security to make decisions on whether to allow or deny particular types of network traffic to computing resources operated by the customer. For example, the customer can use this information to determine whether to permanently allow (e.g., whitelisting) connections from the customer's web-service frontend to a customer database.

The remote diagnostic and troubleshooting visualization browser 202 may produce a graphical representation of connections between customer operated computing resources and one or more other computer systems based at least in part on a set of events detected by one or more host-based firewalls in a display pane 204 of the remote diagnostic and troubleshooting visualization browser 202. For example, the remote diagnostic and troubleshooting visualization browser 202 may, in response to a request from a customer, transmit an API call or other command to the security service for information on network traffic obtained from a plurality of host-based firewalls as described above in connection with FIG. 1. The display pane 204 may display a variety of information to the customer such as process identifier associated with the network traffic, application identifier associated with the network traffic, host identifier associated with the network traffic, network address associated with the network traffic, port number associated with the network traffic, user identifier associated with the network traffic, or any other information associated with the network traffic suitable for aiding the customer in making security decisions.

In addition, the customer may classify or logically group customer operated computing resources and/or users thereof. For example, the customer can be an organization with a plurality of employees each assigned user information and provided access to the customer operated computing resources. The customer can then classify computing resources by employees that are provided access (e.g., technicians, administrators, managers). The customer may also tag computing resources and provide additional metadata corresponding to the computing resource. For example, a customer can tag a particular virtual machine or set of virtual machines as a webserver, web-service front, remote desktop, or other contextual information that provides the customer with useful information. As described in greater detail below, this information may be used to determine whether to apply decisions made by the customer to one or more other computing resources and whether to aggregate information on network traffic received by multiple host-based firewalls. For example, a customer may have 10 computing resources labeled as "database" each with a host-based firewall, the security service may aggregate information from computing resources based at least in part on the label (e.g., tag or other metadata associated with the computing resource and/or customer) and present the customer with a single decision and apply the customer decision across a plurality of computing resources that share the same label.

The graphical representation contained in the display plane 204 may be displayed using tables, block diagrams, generated images, or visualization elements and may, in some embodiments, include one or more icons. The remote diagnostic and troubleshooting visualization browser 202 may include a set of options 212 used to perform various functions in connection with the remote diagnostic and troubleshooting visualization browser 202. The set of options 212 may be a set of functions included in the remote diagnostic and troubleshooting visualization browser 202 that enables a customer to perform a variety of operations such as managing accounts, creating diagnostic tasks, and managing computing resources. The options 212 may be configured as graphical user interface elements of the remote diagnostic and troubleshooting visualization browser 202.

The account button may be configured to enable the customer to select particular customer accounts to perform diagnostic and troubleshooting operations in connection with the selected customer accounts. In various embodiments, the customer operating the remote diagnostic and troubleshooting visualization browser 202 is required to have, at the minimum, complete read permissions across all of the customer services and computing resources associated with the accounts the customer is attempting to perform diagnostic and troubleshooting operations in connection with. The editor button may be configured to enable the customer to create or edit tags, labels, security groups, firewall rules, provide additional operational information, accounts, or modify operations associated with the security service.

In various embodiments, the customer is provided with resources to aid in determining what events may be a greater security risk and should be denied or otherwise blocked. Once information on network traffic is obtained by the host-based firewall, the customer may be provided with a trust score or other indication of a threat level associated with a particular network connection or attempted network connection. The trust score may also be used, as described in greater detail below, during enforcement of a set of rules generated based at least in part on customer decisions. For example, a particular rule may enable a browser application to establish a network connection with any address on a network so long as the trust score associated with that address is above a threshold. In addition, the network traffic information and customer decision information may be saved in such a manner that they are accessible to all customer accounts and/or all other customers of the computing resource service provider. In this manner, events detected across various customer accounts may be detected and mitigated. The network traffic information and customer decision information may also be submitted to the computing resource service provider for review and approval and after review, if the customer decisions are found to be of good quality, it may be used to generate a set of rules published to all customers.

The remote diagnostic and troubleshooting visualization browser 202 may further include an event viewer 210. The event viewer may be configured to provide information related to anomalous or other events detected in network traffic information. This information may provide a set of data associated with systemic, operational, or maintenance events and the impact on customer computing resources along with schedules and remediation suggestions. The information displayed in the event viewer 210 may be generated automatically or in response to a customer executing a diagnostic task. The remote diagnostic and troubleshooting visualization browser 202 may also include a knowledge base 208 which includes articles and provides access to curated content based at least in part on the information collected from customers of the computing resource service provider or generated by the computing resource service provider. The knowledge base may include suggestions on remedial actions for specific computing resource issues or suggest relevant diagnostic tasks that could provide additional information. In addition, diagnostic tasks may suggest or recommend particular knowledge-based articles based at least in part on a result of the diagnostic task.

Customers while working on a specific issue associated with an account or account group may use the remote diagnostic and troubleshooting visualization browser 202 to provide the technical support service with additional information corresponding to the customer computing resources. The customer may use editing tools 218 to edit or modify existing computing resources. For example, the customer may use the editing tools 218 to edit security settings for one or more computing resources based at least in part on network traffic information and/or customer decision information. Furthermore, the editing tools 218 may include tools to analyze security threats in customer decisions and rules generated based at least in part on customer decisions as well as suggest new rules or modifications to existing rules.

Once a customer has established a connection to the security service through the remote diagnostic and troubleshooting visualization browser 202, the remote diagnostic and troubleshooting visualization browser 202 may automatically populate the customer's display with the information in various components of the remote diagnostic and troubleshooting visualization browser 202, such as the event viewer and knowledge base. The customer may also be able to choose network traffic information and customer decision information to include in the display plane 204 based at least in part on a recommendations section or search for one using relevant keywords (not shown in FIG. 2 for simplicity). The display plane 204 displaying network traffic information may include information such as an address of various computing resources, one or more open ports of various computing resources, and a trust score associated with the IP address of various computing resources. Other information may be displayed such as other unique identifiers of various computing resources, response times of various computing resources, and any other information obtained by the security service or other computer system such as a host-based firewall.

As an operation enabled by the remote diagnostic and troubleshooting visualization browser 202, customers can view different regions from a drop down menu 220. The different regions may include different geographical regions or different logical regions within the same or different geographical regions. For example, different regions may include two or more separate virtual networks. Customers may navigate to a particular group using a graphical user interface element as illustrated in FIG. 2. Selection of a particular region may limit the network traffic information, customer decision information, and generated views to information and operations specific to the region. In various embodiments, the customer uses remote diagnostic and troubleshooting visualization browser 202 to monitor the computing resources or regions associated with specific computing resources.

Figure 3:
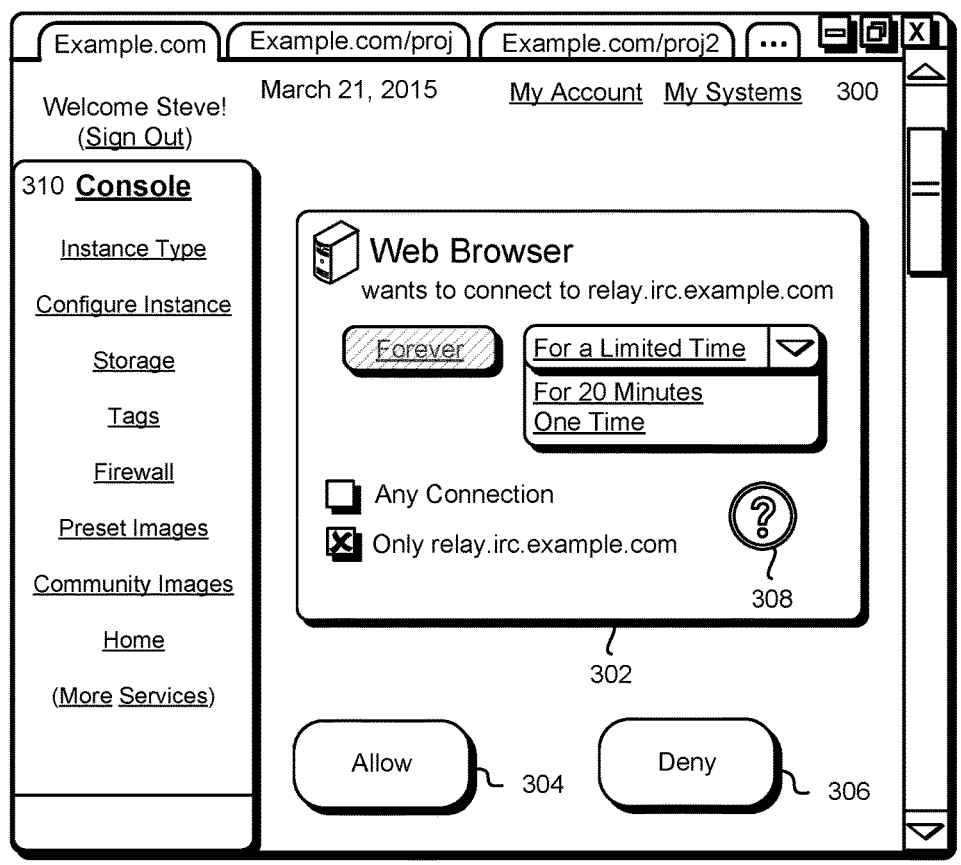
FIG. 3 is a diagram illustrating a management console exposed as a webpage for making decisions associated with network traffic in accordance with at least one embodiment.

FIG. 3 shows a webpage 300 which may be displayed by an application executed by a computing system enabling a customer to interact with a security service operated by the computing resource service provider. As illustrated in FIG. 3, the webpage 300 includes various graphical user interface elements that enable customers to provide access to network traffic information and make decisions corresponding to the network traffic information through a management console of which the webpage 300 is a part. In various embodiments, the customer interacts with the security service or component thereof such as a host-based firewall by issuing commands through the management console. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to a variety of different actions the customer may cause to be performed.

The management console pages may correspond to operations that may be taken to manage or otherwise control the security service or other computing services of the computing resource service provider. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, an HTTP request for the content associated with the link to a server that provided the webpage 300 or another server.

In this example, the webpage 300 may include a pop-up window 302 displaying network traffic information to the customer and prompting the customer to make a decision corresponding to the network traffic information. The network traffic information may include any information associated with network traffic to a customer operated computing resource as described herein. As illustrated by FIG. 3, the network traffic information may indicate a web browser application is attempting to connect to a particular Internet address. The security service may be configured such that one or more host-based firewalls prevent the establishment of the connection by the web browser application until a decision is obtained from the customer. The customer may be provided with additional options as illustrated in FIG. 3, such as allowing all connections by the web browser application or allowing connections for a certain duration.

In addition, the customer may be presented with "findings" 308 which may include information to aid the customer in making the discussion include the pop-up window 302. The findings button 308 may be a graphical user interface element of the webpage 300 where the underlying code of the webpage 300 is configured such that selection by an input device of the findings button 304 causes information corresponding to the selection of customer on the webpage 300 to be transmitted to the security service or other service of the computing resource service provider. For example, selection of the findings button by the customer causes information to be displayed such as whether the connection is encrypted, an age associated with an encryption key, a number of total connection attempts, a number of inbound connections, a number of outbound connections, an address associated with the connections, or any other information suitable in aiding the customer in the decision. Furthermore, the customer can examine the information and make additional decisions based at least in part on the information displayed to the customer. For example, the customer can select a particular connection displayed in the findings and provide to the security service, through the management console, a selection indicating that the particular connection is to be always denied. The security service may then generate a rule based at least in part on the customer decision. Findings may be generate for applications, disk images, network connections, customers, computer systems, or any entities or system that may impact the security of the customer.

In this example, the webpage 300 also includes a graphical customer element configured as an "allow" button 304. The allow button 304 may be a graphical user interface element of the webpage 300 where the underlying code of the webpage 300 is configured such that selection by an input device of the next button 304 causes information corresponding to the selection of customer to allow network traffic selected on the webpage 300 to be transmitted to the security service or other service of the computing resource service provider. For example, the selecting of the allow button 304 may cause security service to receive the customer's selection to allow the connection and, as a result, may cause one or more host-based firewalls to allow future and/or current connection attempts to the customer operated computing resources associated with the host-based firewall.

Furthermore, through the management console, the customer may be guided through the process of making decisions to be provided to the security service. For example, the customer may be prompted to make a decision based at least in part on recommendations from the security service and/or other customers. The process may be divided into steps and the customer may be prompted to provide information at each step. For example, the webpage 300 displays to the customer a list of different types of computing systems suitable for applying decisions to and modifying host-based firewalls associated with the different types of computing systems. The customer, using an input device, may select a set of computing systems to provide the operational information. The customer selection may be stored until the entire process is completed or the customer selection may be transmitted to the security service upon selection of a graphical user interface element.

As illustrated in FIG. 3, the webpage 300 may contain a graphical user interface element configured as icons displaying information associated with the computing resources operated by the customer that may contain and/or generate findings. The icons may correspond to particular computing resources utilized and/or available to the customer. The webpage 300 may also include a graphical customer element configured as a "deny" button 306. The deny button 306 may be a graphical user interface element of the webpage 300 where the underlying code of the webpage 300 causes the application displaying the webpage 300 to transmit a command to the security service or host-based firewall to deny the particular connection attempt illustrated in the pop-up window 302.

Once the customer has made a selection using the webpage 300 and selected the allow button 304, the application displaying the webpage 300 may submit an HTTP request to the security service to request the security service generate a set of rules based at least in part on the decision. The request may be transmitted to one or more servers of the computing resource service provider. Furthermore, the security service may obtain additional information from one or more other services in order to complete the request from the customer. For example, the security service may obtain metadata associated with the customer and/or customer operated computing resources to determine one or more other computing resources to apply the set of rules.

Figure 4:
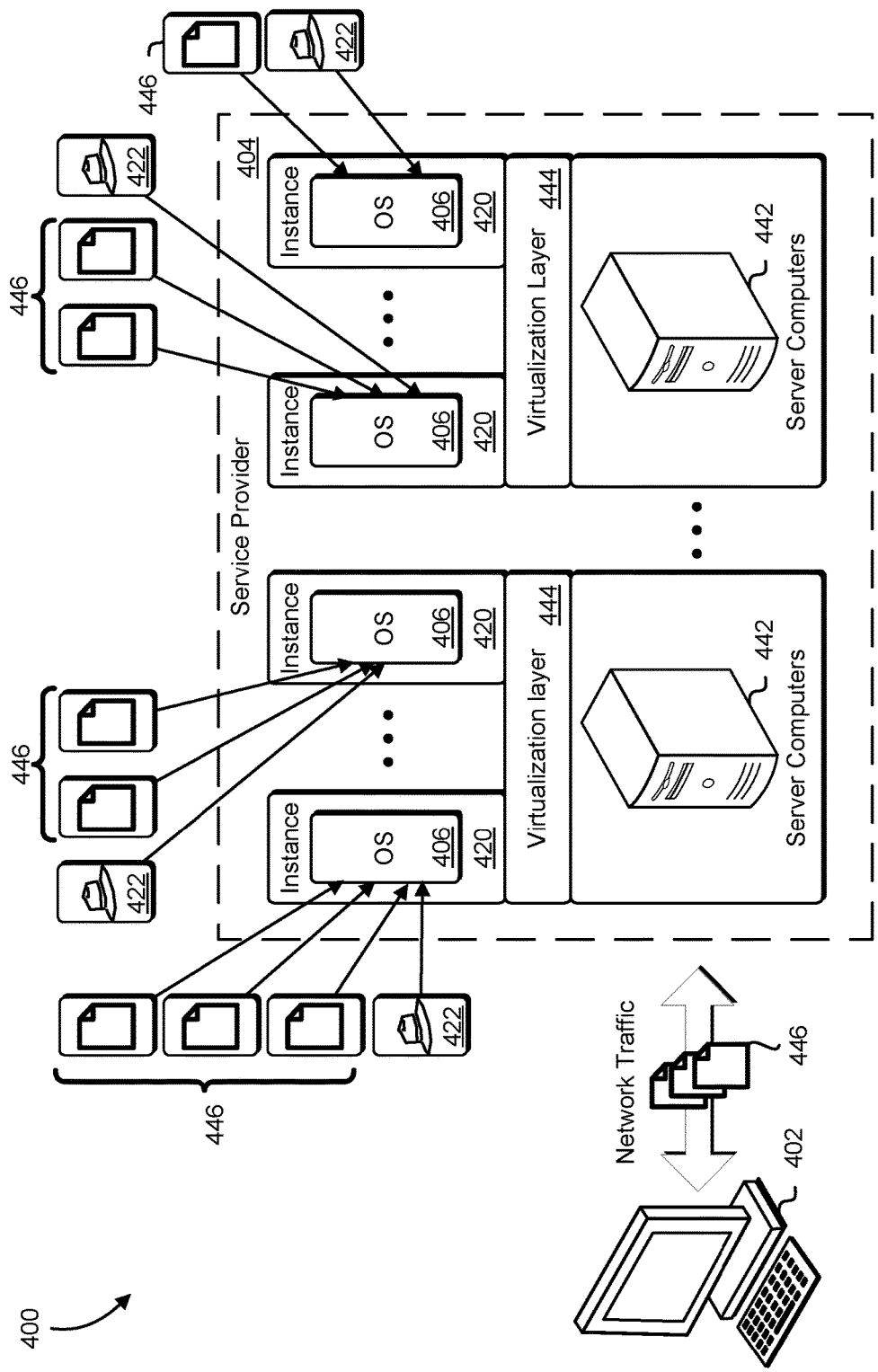
FIG. 4 illustrates an environment in which customers may be provided with a host-based firewall in accordance with at least one embodiment.

FIG. 4 illustrates an aspect of an environment 400 in which an embodiment may be practiced. Specifically, FIG. 4 depicts a host-based firewall 422, as described above in connection with FIG. 1. In addition, FIG. 4 illustrates a server computer 442 executing a plurality of virtual machines 420 implementing an operating system 406. A computing resource service provider 404 may utilize the server computers 442 to provide computing resources to one or more customers 402. The system hardware may include one or more server computers 442, also referred to as host computer systems. Each of the server computers 442 may be any device or equipment configured to execute instructions for performing data computation, manipulation, or storage tasks, such as a computer or a server. The server computers 442 may be equipped with any needed processing capability including one or more processors, such as a central processing unit, a graphics processing unit, or a digital signal processor. The server computers 442 may also be equipped with memory (e.g., static and dynamic memory), buses, and input and output ports that are compliant with any handshaking, communications or data transfer protocol. The system hardware may also include storage devices, such as storage disks and tapes, and networking equipment. The storage devices may be network storage devices managed by a data storage service, such as a block-level data storage service.

Virtualization layers 444 in the system hardware enable the system hardware to be used to provide computational resources upon which one or more virtual machines 420 may operate and use to execute software functions and other tasks. The virtualization layer 444 may be any device, software, or firmware used for providing a virtual computing platform for the virtual machines 420. The virtualization layers 444 executing on the server computers 442 enable the set of system hardware to be used to provide computational resources necessary to support the virtual machines 420. Furthermore, the server computers 442 may host multiple virtualization layers of the same or different types on the same system hardware. Each virtual machine 420 may include various virtual computer components, such as one or more virtual processors, virtual memory, and virtual storage. The virtual machines 420 may be provided to the customer 402 operated by customers of the computing resource service provider 404 and the virtual machines 420 may run an operating system 406 and applications (e.g., software functions 410) on each of the virtual machines 420. An example of a virtualization layer 444 includes a hypervisor.

Requests may be received by a request interface, such as a front end service (not shown in FIG. 4 for simplicity) of the security service operated by the computing resource service provider 404. The request interface may direct requests to the appropriate virtual machine 420 or host-based firewall 422. Each virtual machine 420 may include one or more host-based firewalls 422. The host-based firewalls 422 may be configured to monitor network traffic 446 at the virtual machines 420 and enforce a rule set governing network traffic 446 at the virtual machines 420. The host-based firewalls 422 may be further configured to perform logging of events (e.g., connection attempts) and gather telemetry data related to the virtual machines 420. As described above, the host-based firewall 422 may include a default rule set used to make determinations on network traffic 446 during a training phase of the host-based firewall 422. In addition, although the host-based firewall 422 in FIG. 4 is illustrated as a component of the operating system 406 of the virtual machine 420, the host-based firewall 422 may be a separate component of the server computers 442 or a component of another computing device or application such as the virtualization layer 444 or a network stack of the virtualization layer 444 or virtual machine 420.

The operating systems 406 may be any operating systems suitable for running within the virtual machines 420. Examples of such operating systems include various implementations of Linux® operating systems or Windows® operating system. In some embodiments, various events will trigger or otherwise cause a container, module, or other executable code executing within the virtual machine to perform various operations. For example, a particular connection attempt from an unknown IP address causes a notification to be transmitted to an administrator. In another example, the administrator transmits an event to a particular virtual machine 420, the event causes the particular virtual machine to update one or more settings of the host-based firewall 422 of the particular virtual machine 420 or some other virtual machine 420.

Figure 5:
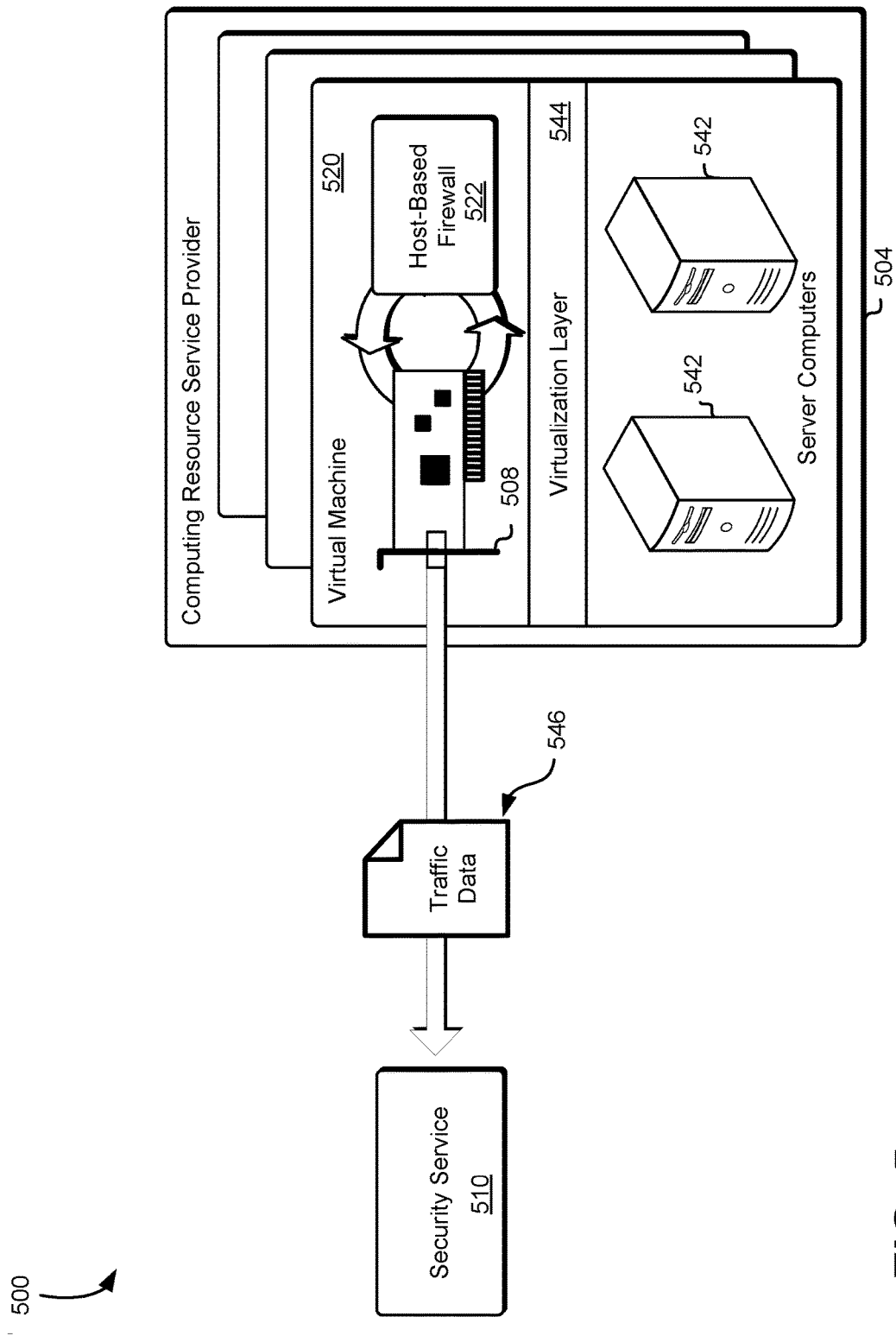
FIG. 5 illustrates an environment in which a host-based firewall may obtain network traffic information in accordance with at least one embodiment.

FIG. 5 illustrates an environment 500 in which a security service 510 of a computing resource service provider 504 may obtain network traffic 546 from in accordance with at least one embodiment. The security service 510, which may be implemented by physical hardware, is used by the computing resource service provider 504 to collect network traffic 546 (e.g., disk images) on behalf of customers and/or other services of the computing resource service provider 504 and present the customer with decisions regarding the network traffic 546 such that the decision made by the customer may be used, by the security service 510, to generate a rule set for the host-based firewall 522, or other security device, to enforce security policies and similar determinations regarding network traffic 546. The security service 510 may include a group of computing systems, such as the server computers 542 described in detail above, configured to generate decision information based at least in part on network traffic 546 obtained from host based firewall 522 executed by a virtual machine 520.

The physical hardware may include a server computer 542. The server computer 542 may be any device or equipment configured to execute instructions for performing data computation, manipulation, or storage tasks, such as a computer or a server. A server computer 542 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like. In addition, the server computers 542 may contain specialized hardware for performing disk forensics such as high capacity hard disk drives and security dongles for performing forensic analysis.

A virtualization layer 544 may include a bare metal hypervisor or a hosted hypervisor. The virtualization layer 544 executing on the service computer 542 enables the physical hardware to be used to provide computational resources upon which one or more virtual machines 520 or other computing resources may operate. For example, the virtualization layer 544 enables a particular virtual machine 520 to access physical hardware on the server computer 542 through virtual device drivers (e.g., a virtual network interface 508) or other executable code on the virtual machine 520. The virtualization layer 544 may include a hypervisor or virtualization software and/or hardware. The virtualization layer 544 may also include an instance of an operating system dedicated to administering the virtual machine 520 or other computing resource executing on the server computer 542. Each virtualization layer 544 may include its own networking software stack, responsible for communication with other virtualization layers 544 and, at least in some embodiments, also responsible for implementing network connectivity between the virtual machine 520 or other computing resources executing on the server computer 542 and virtual machine 520 or computing resources executing on other server computers 542.

Furthermore, the server computer 542 may host multiple virtualization layers 544 of the same or different types on the same server computer 542 as well as virtual machine 520 of the same or different types. For example, a server computer system 542 may host a first virtual machine 520 instantiated from a first disk image and operated by a first customer and may host a second virtual machine 520 instantiated from a second disk image that is operated by a second customer. The virtualization layer 544 may be any device, software, or firmware used for providing a virtual computing platform and/or virtualized computing resources for the virtual machine 520 and/or component thereof. The virtual computing platform may include various virtual computer components, such as one or more virtual CPUs, virtual memory, virtual disk storage, virtual network interfaces 508, and the like. The virtual machine 520 may be provided to the customers or other service of the service provider 504 and the customers may utilize the virtual machine 520 or components thereof. Further, the computing resource service provider 504 may use one or more of its own virtual machines 520 for supporting execution of its applications and providing computing resources for such applications.

As illustrated in FIG. 5, the virtual machine 520 may include the virtual network interface 508 and the host-based firewall 522. The virtual network interface 508 may, for instance, be operationally attached to virtual machine 520 and provided by the virtualization layer 544 through one or more physical network interfaces which provide the server computers 542 with access to one or more networks. The virtual network interface 508 provides the virtual machine 520 access to the physical network interfaces of the server computers 542. The host-based firewall 522 may include software or other executable code loaded into memory of the virtual machine 520 that, when executed by one or more processors of the virtual machine 520, cause the virtual machine 520 to provide information on network traffic to the security service 510 and allow or deny network traffic 546 based at least in part on a set of rules as described above.

Commands and other information may be included in an application program interface (API) call from the security service 510 to the virtualization layer 544. The security service 510 may obtain network traffic 546 as described above in connection with FIG. 1. In response to a command to perform security operations in connection with the virtual machine 520, the security service 510 may transmit an API call to the virtualization layer 544, causing the virtualization layer 544 to load the host-based firewall 522 into memory of the virtual machines 520. In yet other embodiments, the customer loads the host-based firewall 522 into memory of the virtual machines 520 without a contemporaneous API command from the security service 510. In yet other embodiments, the security service 510 may perform security operations without a corresponding command from a customer. In addition, the security service 510 may be configured to communicate directly with the virtual machine 520 and may not transmit commands to the virtualization layer 544.

The security service 510 may obtain information on network traffic 546 from the host-based firewall 522 executed by the virtual machine 520. The security service 510 may provide the information on network traffic 546 to the customer or may generate findings and/or decisions to prompt the customer to provide additional information corresponding to the network traffic 546. For example, the security service generates a decision, as described above in connection with FIG. 3, the decision is displayed to the customer and the customer provides a response. The customer response may then be used to generate a rule or set of rules. For example, if the decision displayed to the customer is whether to allow or deny traffic to a particular network address over port 1440 and the customer selects deny for a particular application, a rule may be generated that causes the host-based firewall 522 to deny all connection attempts between the particular network address over port 1440 and the particular application detected in network traffic 546.

In various embodiments, the server computers 542 include a network interface controller including an on-board processor described in greater detail below. Note that more than one network interface controller may be present within any of the server computers. As noted, the network interface controller may include an on-board processor, examples of which include, but are not limited to, any suitable processing device, such as one or more of a microprocessor, a co-processor, a micro-controller, a microcomputer, a central processing unit, a graphics processing unit, application specific integrated circuit (ASIC), custom reduced instruction set computing (RISC) chip or some other programmable logic device. Examples of such processing devices include, but are not limited to, devices based on an Intel x86 architecture, an Itanium architecture, a reduced instruction set (RISC) architecture (including ARM, Power Architecture and Blackfin architectures), and a SPARC architecture. The on-board processors may be integrated with the network interface controller or other component of the server computers 542. The security service may provide the network interface controller including the on-board processor with the rule set and cause the network interface to operate as an enforcement point for network traffic 546 directed to the virtual machine. For example, the customer may determine that all traffic to the Internet over port 3660 is denied, the security service may provide the network interface controlled with a corresponding rule and, as a result, the network interface controller may deny all connection attempts from the internet to the virtual machine 520 over port 3660.

Figure 6:
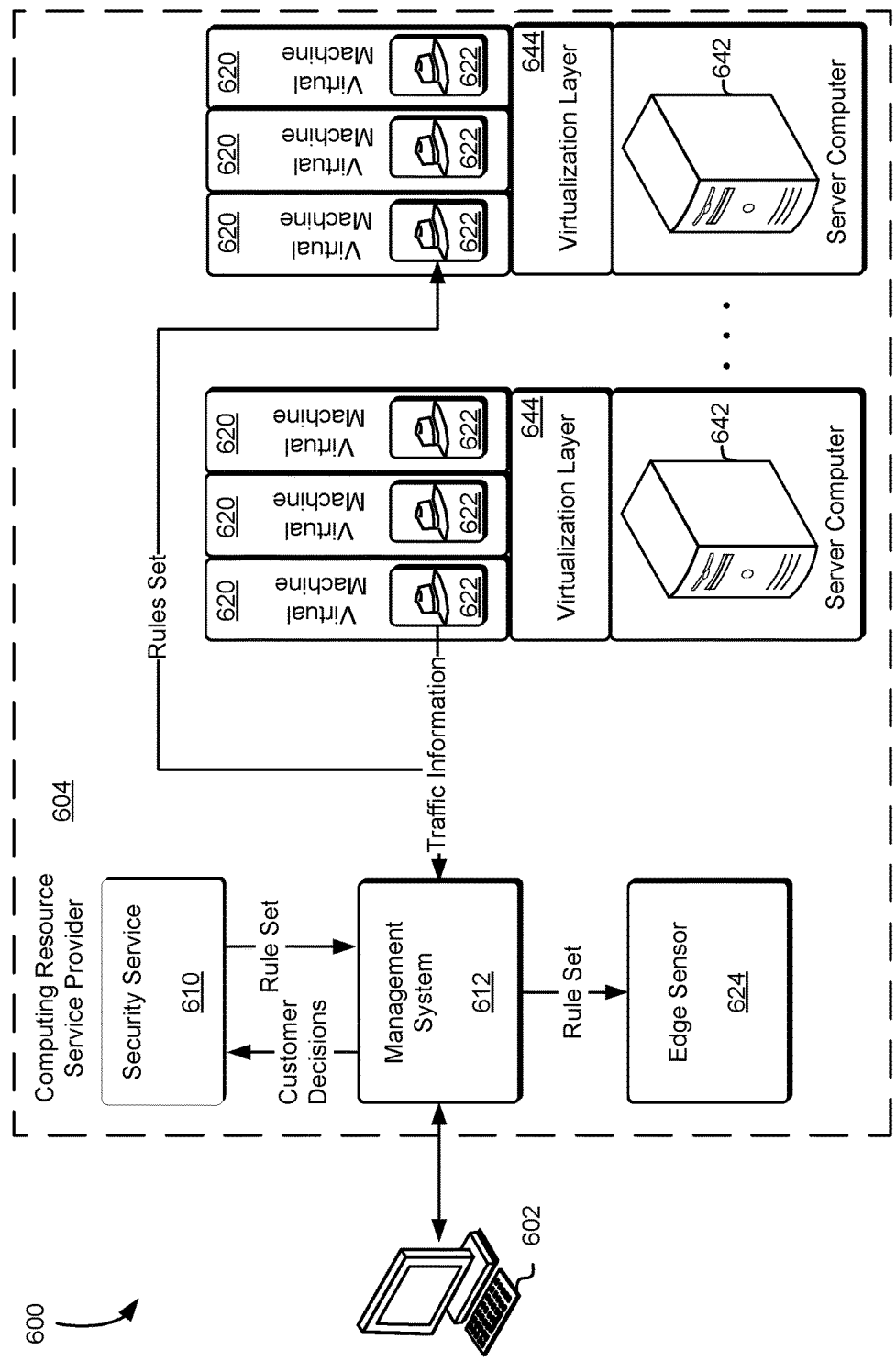
FIG. 6 illustrates an environment in which customer may operate a host-based firewall to mitigate attacks in accordance with at least one embodiment.

FIG. 6 illustrates an environment 600 in which a security service 610 of a computing resource service provider 604 may perform analysis of network traffic information, obtain customer decisions, and generate rule sets for network traffic at various informant points in accordance with at least one embodiment. The security service 610, which may be implemented by physical hardware, is used by the computing resource service provider 604 to perform analysis of network traffic on behalf of customers 602 and provide the customers 602 with a result of the analysis. The security service 610 may include a group of computing systems, such as the server computers 642 described in detail below, configured to generate a set of rules for network traffic based at least in part on network traffic information and decisions on network traffic obtained from customers 602.

The physical hardware may include a server computer 642. The server computer 642 may be any device or equipment configured to execute instructions for performing data computation, manipulation, or storage tasks, such as a computer or a server. A server computer 642 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications, or data transfer protocol. The physical hardware may also include storage devices, such as block-level storage devices, storage disks and tapes, networking equipment, and the like. In addition, the server computers 642 may contain specialized hardware for performing disk forensics such as high capacity hard disk drives and security dongles for performing forensic analysis.

A virtualization layer 644 may include a bare metal hypervisor or a hosted hypervisor. The virtualization layer 644 executing on the service computer 642 enables the physical hardware to be used to provide computational resources upon which one or more virtual machines 612 or other computing resources may operate. For example, the virtualization layer 644 enables a particular virtual machine 620 to access physical hardware on the server computer 642 through virtual device drivers or other executable code on the virtual machine 620. The virtualization layer 644 may include a hypervisor or virtualization software and/or hardware. The virtualization layer 644 may also include an instance of an operating system dedicated to administering the virtual machine 620 or other computing resource executing on the server computer 642. Each virtualization layer 644 may include its own networking software stack, responsible for communication with other virtualization layers 644 and, at least in some embodiments, also responsible for implementing network connectivity between the virtual machine 620 or other computing resources executing on the server computer 642 and virtual machine 620 or computing resources executing on other server computers 642.

Furthermore, the server computer 642 may host multiple virtualization layers 644 of the same or different types on the same server computer 642 as well as virtual machine 620 of the same or different types. For example, a server computer system 642 may host a first virtual machine 620 instantiated from a first disk image and operated by a first customer 602 and may host a second virtual machine 620 instantiated from a second disk image that is operated by a second customer 602. The virtualization layer 644 may be any device, software, or firmware used for providing a virtual computing platform and/or virtualized computing resources for the virtual machine 620 and/or component thereof. The virtual computing platform may include various virtual computer components, such as one or more virtual CPUs, virtual memory, virtual disk storage, and the like. The virtual machine 620 may be provided to the customers or other service of the service provider 604 and the customers may utilize the virtual machine 620 or components thereof. Further, the computing resource service provider 604 may use one or more of its own virtual machines 620 for supporting execution of its applications and providing computing resources for such applications.

A management system 612 may receive telemetry information from one or more host-based firewalls 622 executed by the virtual machines 620. The host-based firewalls 622 may include executable code or computing device described herein capable of obtaining network traffic information from the virtual machines 620 including information identifying a process or application of the virtual machine 620 associated with network traffic. The management system 612, which may be implemented using server computer systems 642 as described herein, may be responsible for management of the host-based firewalls 622. For example, in one embodiment, the management system 612 is responsible for providing a set of rules and updates to the set of rules to the host-based firewalls 622 and ensuring that the host-based firewalls 622 are correctly enforcing the set of rules. In addition, the management system 612 may be responsible for managing other enforcement points within the computing resource service provider 404, such as an edge sensor 624 described in greater detail below.

The security service 610 may be responsible for processing network traffic information and customer decisions to generate the set of rules. The security service 610 may generate the set of rules such that the set of rules causes various firewalls and other enforcement points to monitor and control the incoming and outgoing network traffic based at least in part on the set of rules. The customer may provide decisions on network traffic as described above. The security service may determine the set of rules based at least in part on the decision provided by the customer. In addition, the security service may determine the set of rules based at least in part on other security information such as a trust score, decision obtained from other customers, information obtained from intrusion detection systems, or any other information suitable for generating the set of rules for one or more enforcement points.

The enforcement points may include an edge sensor 624 which may be a gateway, router, firewall, or other computing device configured to transmit and receive network traffic. The security service may determine whether particular rules of the rule set are to be enforced at the edge sensor 624, host-based firewall 622, or other location. For example, if the customer wants to block network traffic from 3,000 distinct IP addresses, the security service 610 then generates a set of rules that causes the enforcement point to block the network traffic and determine to provide the rule to the host-based firewall 622. The security service 610 may determine to provide the set of rules to the host-based firewall 622 based at least in part on several factors such as size of the rule set and whether state information must be tracked to enforce the rule set.

Figure 7:
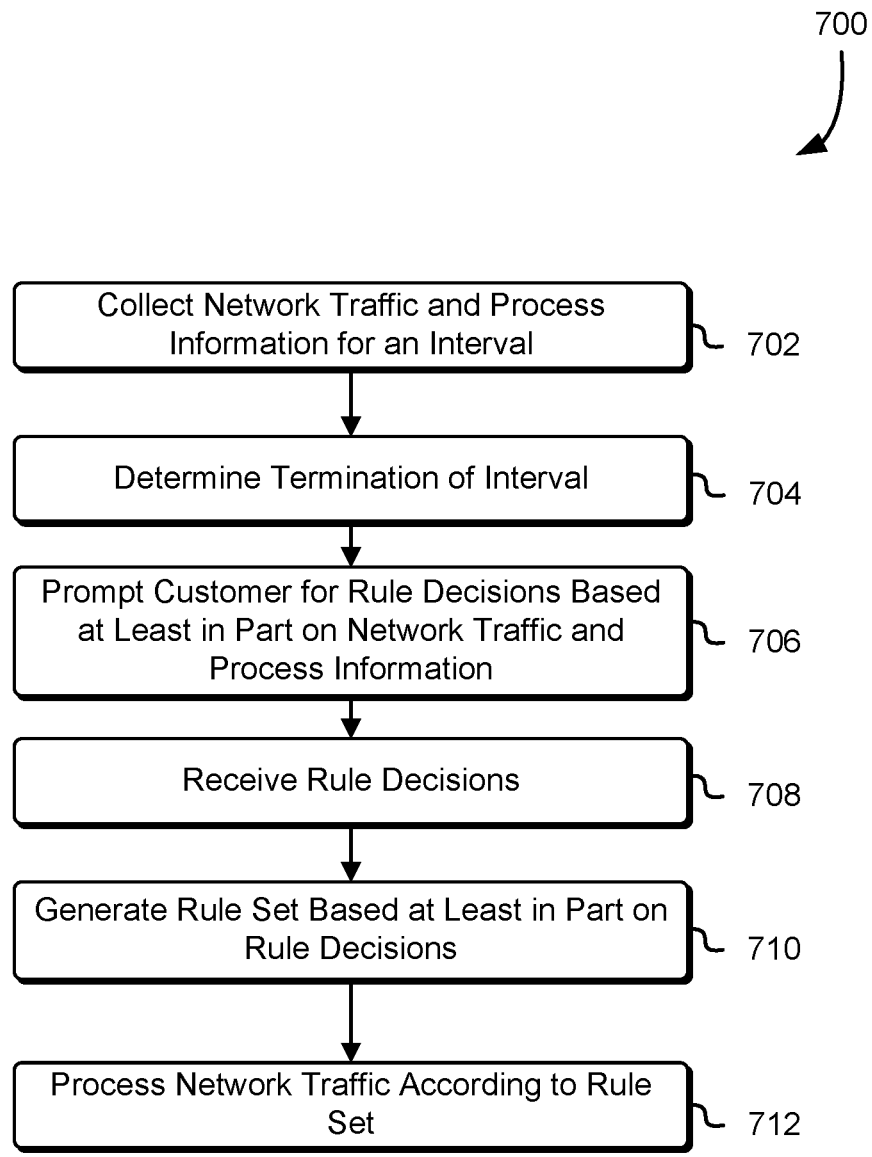
FIG. 7 shows an illustrative process which may be used to operate a host-based firewall in accordance with at least one embodiment.

FIG. 7 is a block diagram illustrating an example of a process 700 for executing a host-based firewall in accordance with at least one embodiment. The process 700 may be performed by any suitable system such as a security service or component thereof, such as a host-based firewall, as described above in connection with FIGS. 4 through 6. The process 700 includes collection, by a host based firewall, of network traffic and processing information for an interval 702. As described above, the host-based firewall may be a customer/operating system level application with access to network traffic information and process information associated with the network traffic. The host-based firewall may initially, or at various points in time, enter a training phase during which network traffic and process information is collected to generate a set of decisions on traffic to provide to a customer. The security service, as described above, may obtain the network traffic and process information from the host-based firewalls. The security service may then determine the interval (e.g., training phase) has terminated 704. The determination may be based at least in part on a variety of factors including a duration of time or an amount of information obtained.

The security service may then prompt a customer for rule decisions based at least in part on the network traffic and process information 706. The security service may generate rule decisions or may simply provide the customer with the network traffic and process information obtained from the host-based firewall. The rule decisions may include a prompt to the customer from additional information as described above in connection with FIG. 3. The security service may then receive rule decisions from the customer 708. The rule decisions may be received through a management console as described above. In addition, the rule decisions may be obtained from multiple different customers. The security service may then generate a set of rules based at least in part on the rule decisions 710. The set of rules may be configured to allow or deny particular network connections or network traffic based at least in part on the decisions of the customer. The security service may then cause one or more end points to process network traffic according to the set of rules 712. The security service or other system such as the management system, as described above, may provide the rule set to the enforcement point. Enforcement points may include host-based firewalls, edge sensors, firewalls, or other computing devices capable of transmitting and receiving network traffic.

Figure 8:
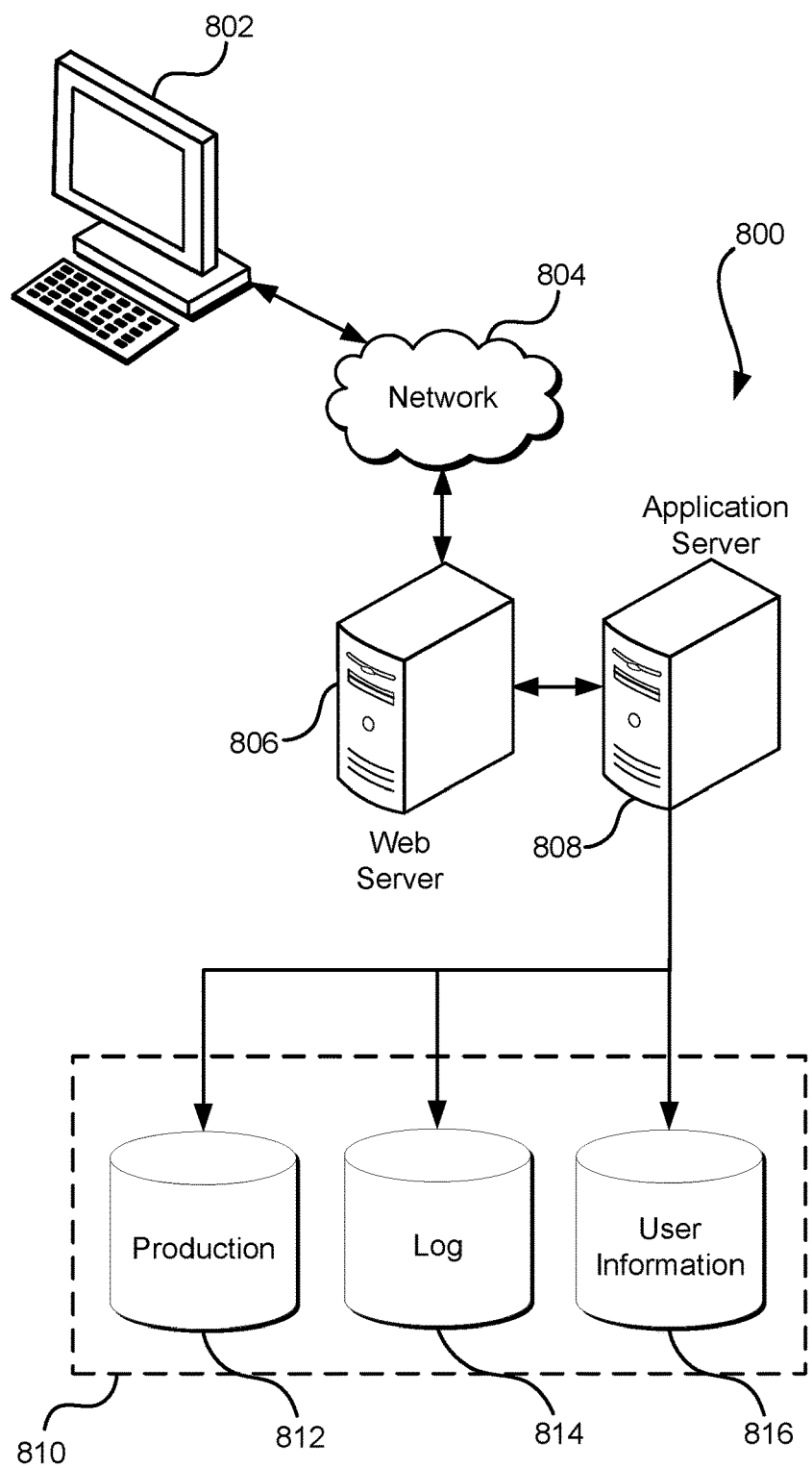
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    executing a host-based firewall loaded into memory of a virtual machine instance operated by a customer of a plurality of customers of a computing resource service provider, where the virtual machine instance is a computing resource that is a member of a set of computing resources provided to the plurality of customers by the computing resource service provider;
    obtaining network traffic information from the host-based firewall, the network traffic information indicating a set of connection attempts between the virtual machine instance and at least one other computer system and a particular application of one or more applications executed by the virtual machine instance associated with a particular connection attempt of the set of connection attempts;
    prompting the customer for decisions to allow or deny the set of connection attempts by at least providing the customer with a notification of the set of connection attempts;
    obtaining, from the customer, a first set of decisions to allow or deny the set of connection attempts;
    obtaining, from a different customer, a second set of decisions to allow or deny another set of connection attempts between a virtual machine instance of the different customer and at least one other computer system;
    generating a rule set by the host-based firewall based at least in part on the first set of decisions and the second set of decisions; and
    enforcing, by the host-based firewall, the generated rule set.

2. The computer-implemented method of claim 1, wherein executing the host-based firewall further comprises providing the host-based firewall with a default rule set for enforcing network traffic decisions on the computing resource operated by the customer while network traffic is obtained prior to receiving the first set of decisions.

3. The computer-implemented method of claim 1, wherein the computer-implemented method further comprises:
    obtaining a request to generate a finding associated with a first application of the one or more applications executed by the computing resource operated by the customer, where the finding indicates additional information to aid the customer with the first set of decisions;
    generating the finding associated with a first application based at least in part on network traffic information indicating the first application; and
    providing the customer with the finding associated with a first application.

4. The computer-implemented method of claim 1, wherein the computer-implemented method further comprises executing a training phase of the host-based firewall by at least:
    allowing a plurality of network connections directed to the computing resource operated by the customer for an interval of time; and
    wherein prompting the customer for decisions to allow or deny the set of connection attempts corresponds to a set of network connections established during the interval of time.

5. A system, comprising:
    one or more processors; and
    memory that includes instructions that, when executed by the one or more processors, cause the system to:
        obtain network traffic information from one or more host-based firewalls implemented by a plurality of virtual machine instances operated by a plurality of customers of a computing resource service provider, the network traffic information indicating one or more processes executed by the plurality of virtual machine instances and associated with one or more network connections included in the network traffic information;
        generate a set of rules for network traffic based at least in part on decisions received from at least two of the plurality of customers, the decisions identifying whether to allow or deny a set of connection attempts between virtual machine instances of the at least two of the plurality of customers and other computer systems;
        provide the set of rules to the one or more host-based firewalls; and
        enforce, by the host-based firewalls, the set of rules.

6. The system of claim 5, wherein memory further comprises instructions that, when executed by the one or more processors, cause the system to prompt, by at least invoking an application programming interface call, the plurality of customers for additional information associated with allowing or denying the one or more network connections included in the network traffic.

7. The system of claim 5, wherein memory further comprises instructions that, when executed by the one or more processors, cause the system to display, through a management console accessible to the plurality of customers, the network traffic information, the plurality of customers provide decisions on the network traffic information through the management console.

8. The system of claim 5, wherein memory further comprises instructions that, when executed by the one or more processors, cause the system to aggregate at least a portion of the network traffic information based at least in part on metadata associated with the plurality of virtual machine instances indicating a relationship between at least a portion of the plurality of virtual machine instances.

9. The system of claim 8, wherein generating the set of rules for network traffic further comprises generating, based at least in part on the metadata, a subset of the set of rules for the portion of the plurality of virtual machine instances.

10. The system of claim 5, wherein memory further comprises instructions that, when executed by the one or more processors, cause the system to provide the set of rules to one or more edge sensors that are responsible for distributing network traffic to plurality of virtual machine instances.

11. The system of claim 5, memory further comprises instructions that, when executed by the one or more processors, cause the system to:
    detect an event provided by a customer of the plurality of customers; and as a result of detecting the event, modify one or more settings of at least one host-based firewall of the one or more host-based firewalls.

12. The system of claim 5, wherein generating the set of rules further comprises correlating decisions corresponding to the one or more network connections included in the network traffic information between the plurality of customers.

13. A non-transitory computer-readable storage medium having stored thereon executable instructions that, as a result of being executed by one or more processors of a computer system, cause the computer system to at least:
    execute a host-based firewall, the host-based firewall included in memory of the computer system as a result of a command from a customer of a plurality of customers of a computing resource service provider;
    cause the host-based firewall to obtain network traffic information indicating a process associated with network traffic;
    provide the network traffic information to a security service;
    obtain, from the security service, a set of rules for network traffic to be enforced by the host-based firewall, the set of rules for network traffic generated based at least in part on rule decisions made by a plurality of the customers, the rule decisions identifying whether to allow or deny a set of connection attempts between virtual machines of the customers and other computer systems; and
    enforce, by the host-based firewall, the set of rules.

14. The non-transitory computer-readable storage medium of claim 13, wherein the instructions that cause the computer system to execute the host-based firewall further include instructions that cause the computer system to provide the host-based firewall with a default set of rules.

15. The non-transitory computer-readable storage medium of claim 14, wherein the instructions that cause the computer system to provide the host-based firewall with the default set of rules further include instructions that cause the computer system to:
    as a result of the default set of rules, deny one or more connection attempts to the computer system without a rule of the set of rules allowing the connection; and
    prompt a customer for a decision to allow or deny the one or more connection attempts to the computer system.

16. The non-transitory computer-readable storage medium of claim 15, wherein the instructions that cause the computer system to prompt the customer for the decision further include instructions that cause the computer system to transmit a notification to the customer indicating whether to allow or deny the one or more connection attempts to the computer system.

17. The non-transitory computer-readable storage medium of claim 13, wherein the instructions that cause the computer system to receive the set of rules for network traffic further include instructions that cause the computer system to receive a threat score that is associated with the set of rules.

18. The non-transitory computer-readable storage medium of claim 17, wherein the instructions further comprise instructions that, as a result of being executed by the one or more processors, cause the computer system to allow network connections associated with an particular address if the threat score is above a threshold as a result of enforcing a particular rule of the set of rules.

19. The non-transitory computer-readable storage medium of claim 13, wherein the instructions that cause the computer system to enforce the set of rules further include instructions that cause the computer system to enforce a particular rule based at least in part on the particular rule being associated with a metadata tag and an application executed by the computer system being associated with the metadata tag.

20. The non-transitory computer-readable storage medium of claim 13, wherein the instructions further comprise instructions that, as a result of being executed by the one or more processors, cause the computer system to modifying a previous set of rules based at least in part on receiving the set of rules.

* * * * *